United States Patent Office.

CARL SCHILL AND CHRISTOPH SEILACHER, OF STUTTGART, GERMANY.

DOUBLE SALT OF ANTIMONY AND PROCESS OF OBTAINING SAME.

SPECIFICATION forming part of Letters Patent No. 535,601, dated March 12, 1895.

Application filed May 2, 1894. Serial No. 509,824. (Specimens.)

*To all whom it may concern:*

Be it known that we, CARL SCHILL and CHRISTOPH SEILACHER, manufacturers, residing at Alleenstrasse 2, Stuttgart, Germany, have invented new and useful Antimony Double Salts having the Formula $SbFl_3$ $NH_4Fl$ and Process of Obtaining the Same, of which the following is a specification.

This invention relates to the art of obtaining double-salts of antimony, and particularly of salts of antimonious fluorid such as are used as mordants in dyeing and for other purposes.

When these double-salts are used as mordants in the art of dyeing, the active principle therein is solely the antimony, which is precipitated or deposited on the fiber, previously treated with tannin, in the form of antimonious oxid $(Sb_2O_3)$. The acid radical is liberated under this reaction and all the elements of the double-salts other than the antimony constitute merely so much inert or waste matter, which merely adds to the weight of the double-salt without subserving any useful purpose. It is hence desirable to provide such double-salts of antimony which are very rich in antimony. It is, moreover, desirable to obtain these double-salts in as soluble a form as possible so that the mordant bath may act as energetically as possible.

It is the object of the present invention to produce a double-salt of antimonious fluorid which shall answer the above requirements and which, at the same time, shall be made with a minimum of labor and expense.

With this object in view, our invention consists in the process, and the compound resulting from such process which will be hereinafter described and particularly pointed out in the claims.

In a series of experiments conducted by us for the purpose of determining whether there did not exist a double-salt of antimony richer in antimony than Mayer's salt, covered by United States Patent No. 509,478, dated November 28, 1893, whose formula is $2SbF_3.(NH_4)2SO_4$, which produced a maximum amount of 59.2 per cent. of antimonious oxid $(Sb_2O_3)$, we succeeded in obtaining bodies in which the quantity of ammonium sulphate in proportion to the antimony was successively reduced, and which yielded 67.5, 68.1 and 70.0 per cent. of antimonious oxid $(Sb_2O_3)$. All of these bodies, however, still contained sulphuric acid and, from their entire behavior, must be considered as mixtures of various salts. When, however, only ten parts of sulphate of ammonium were brought together with one hundred parts of antimonious oxid, we obtained sharply defined prismatic crystals uniform in character, which contained no more sulphuric acid, but were found to consist of a double fluorid yielding 75.4 per cent. of antimonious fluorid $(Sb_2O_3)$. A decomposition of the sulphate of ammonium hence takes place, the sulphuric acid remaining in the mother liquor, while the ammonia crystallizes together with the antimonious fluorid in the form of ammonium fluorid, the liquor of crystallization always containing an excess of hydrofluoric acid for this purpose. Our experiments then showed that this salt may be obtained directly from antimonious oxid and ammonia, the identical crystals being produced.

The process for obtaining this new double-salt of antimony is in detail as follows: One hundred parts of antimonious oxid are dissolved in excess of hydrofluoric acid, and four parts of ammonia, in the form of spirits of ammonia, are then added to the solution. The solution is then filtered and set aside to crystallize.

The analysis of the air-dried crystals gave the following figures:

| For analysis: | Sb | $NH_4$ | F |
|---|---|---|---|
| I | 63.23% | 3.06% | 33.32% |
| II | 63.26% | 3.12% | 33.20% |

Computing the percentages for $3SbF_3.NH_4F$, the following percentages are obtained: Sb, 63.76 per cent.; $NH_4$, 3.14 per cent.; F, 33.45 per cent. while, for $8SbF_3.2NH_4F$, the percentages differed essentially from those obtained by the above analysis, being as follows: Sb, 64.80 per cent.; $NH_4$, 2.39 per cent., and F, 32.81 per cent. It is obvious, therefore, that the present salt is by no means identical with that covered by German Patent No. 50,281, which has the formula $8SbF_3.2NH_4F$, and which is obtained by a different process. Our salt is a new compound having the formula $3SbF_3.NH_4F$.

Our experiments to obtain a double fluorid still richer in antimony were not successful, and a further reduction of the amount of ammonia added resulted in the production of the same crystals.

Our new double-salt of antimony forms lustrous rhombic prisms, whose obtuse-angled edges are blunted off, and whose lower sides are generally cut off obliquely. The same withstands the action of air and is very soluble in water, ten parts of the salt requiring but eight parts of cold water for complete solution. Its formula, as already stated, is $3SbF_3.NH_4F$.

Since the theory that fluorides when applied as mordants injure the fiber has long ago been disproved, and the small quantity of hydrofluoric acid liberated in the mordant bath may readily be rendered innocuous by a little soda, the present salt, with its great solubility and high percentage of antimony (theoretically yielding 76.02 per cent., and practically, when manufactured on a large scale, about 75 per cent. of $Sb_2O_3$), and relatively small amount of inert matter or ballast, forms a very valuable substitute for tartar emetic.

A very important advantage of the present invention is, moreover, that under it, the double-salt of antimony is formed directly by bringing together oxid of antimony and ammonia in the solution of hydrofluoric acid, and that the liquor from which the salt crystallizes need contain no free acid, as is the case in all other methods of obtaining crystallizable double-salts of antimonious fluorid. Thus, for example, in the process described in German Patent No. 50,281, the free acid in the liquor of crystallization is phosphoric acid, which always remains in the mother liquor. The ammonia added to the solution, therefore, first forms ammonium phosphate and only then during the process of crystallization does it combine with the hydrofluoric acid to form ammonium fluorid. Hence the process under our invention is much simpler, while, at the same time, forming a double salt of antimony substantially as rich in antimony. It was found, moreover, that under our process, the capacity to form crystals has been very materially enhanced.

The potassium and sodium salts corresponding to the present salt of ammonium have not been produced as yet, as their employment offers no advantages over that of the ammonium salt.

What we claim, and desire to secure by Letters Patent, is—

1. In the art of obtaining double salts of antimonious fluorid, the process which consists in adding antimonious oxid to hydrofluoric acid in excess, then adding ammonia to the solution, and then setting the liquid aside to crystallize all in the proportions substantially as set forth.

2. In the art of obtaining double salts of antimonious fluorid, the process which consists in adding antimonious oxid to hydrofluoric acid in excess, then adding ammonia to the solution, and then filtering and setting the liquid aside to crystallize, all in the proportions substantially as set forth.

3. As a new compound, a double salt of antimonious fluorid having the formula $3SbF_3.NH_4F$, which is soluble in the proportion of ten parts of the salt to eight parts of water, and which forms rhombic prisms.

In testimony whereof we have signed this specification in the presence of two subscribing witnesses.

CARL SCHILL.
CHRISTOPH SEILACHER.

Witnesses:
AUGUST B. DRAUTZ,
ARTHUR HOFMANN.